April 1, 1969  E. O. NORRIS  3,436,213
METHOD FOR RECOVERING METALS FROM SEA WATER
Filed April 4, 1967  Sheet 2 of 2

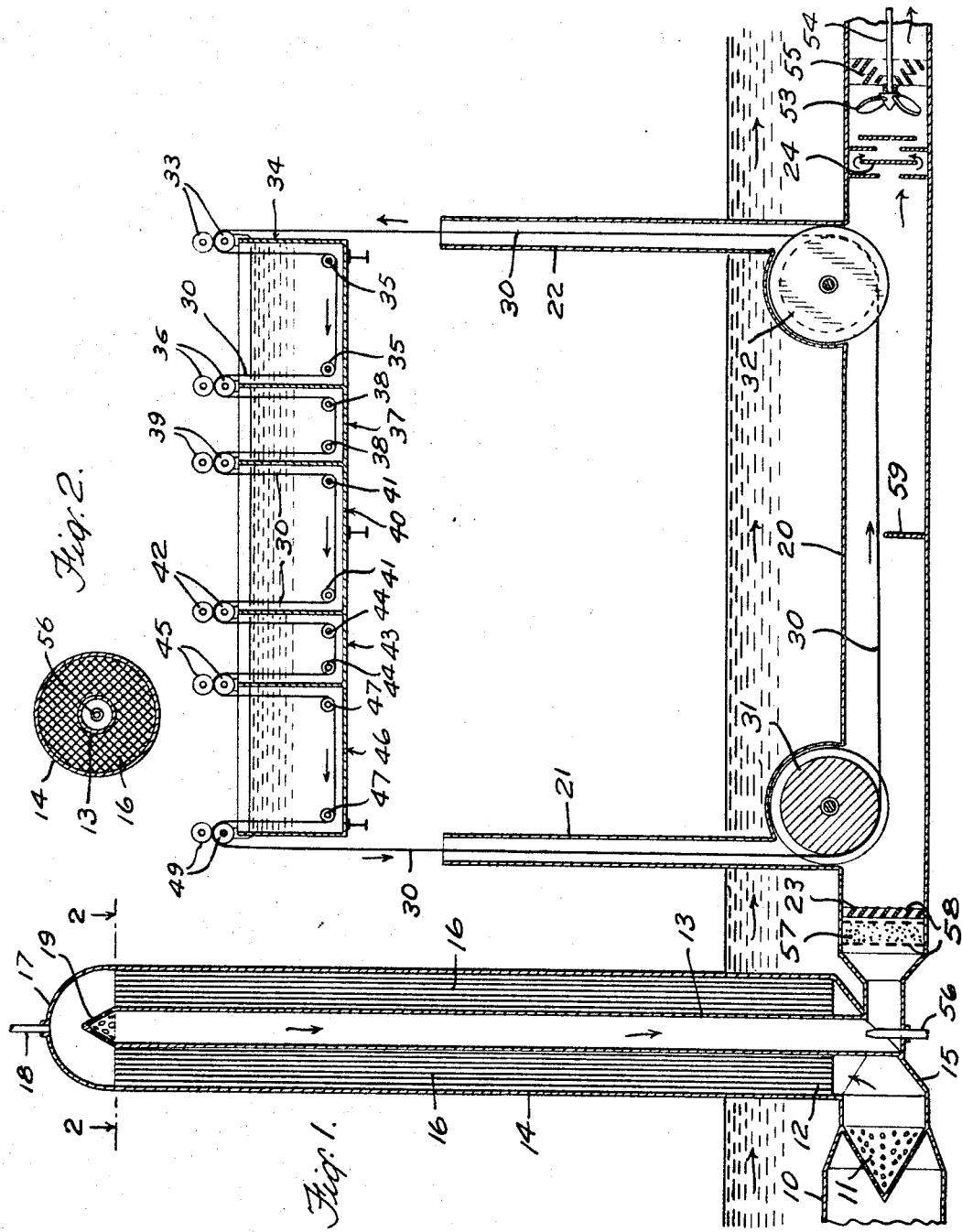

INVENTOR
EDWARD O. NORRIS

BY *Mandeville & Schweitzer*
ATTORNEYS

United States Patent Office 3,436,213
Patented Apr. 1, 1969

3,436,213
METHOD FOR RECOVERING METALS
FROM SEA WATER
Edward O. Norris, 9 Ledgemoor Lane,
Westport, Conn. 06880
Continuation-in-part of application Ser. No. 587,624,
Oct. 18, 1966. This application Apr. 4, 1967, Ser.
No. 628,458
Int. Cl. C22b 7/00; B01j 1/04
U.S. Cl. 75—101                                13 Claims

ABSTRACT OF THE DISCLOSURE

The invention is directed to a method and means for recovering metal ions and/or colloids from sea water. The method involves passing the sea water, usually by means of naturally flowing currents, in contact with metal ions which are more electropositive than the ions to be adsorbed, and subsequently recovering the adsorbed ions to enable the metal content thereof to be extracted.

Cross reference to related applications

This application is a continuation-in-part of my copending application Ser. No. 587,624, filed Oct. 18, 1966, now abandoned, which is a continuation of my prior application Ser. No. 366,102, filed May 8, 1964, now abandoned.

Background and summary of invention

Repeated attempts have been made, over a period of many years, to extract from the sea certain precious and other metals known to be available in the sea. However, in general, these have not proven successful, often because the costs of recovering the available metals may exceed their recovered value. To a degree, this is a function of the enormous volumes of material which must be processed in relation to the amounts of recovered materials, which introduces significant cost factors in connection with materials handling alone.

Thus, according to one aspect of the invention, a new method and means is provided for effecting the extraction of metal values from the sea which, among other things, is compatible with utilization of natural sea currents, such as tidal currents, for effecting bulk material handling. While it has, of course, been proposed heretofore to utilize natural currents for this purpose, the processes for which such natural currents have been proposed to be used have not proven satisfactory for other reasons. The process according to the invention is, on the other hand, ideally suited for the effective employment in flowing sea water environments and for that reason, among others, affords an economically feasible recovery process.

The process of the present invention is based on the discovery that when colloidal precipitated metallic sulphides are adsorbed onto the surface of certain strong, durable, organic, synthetic or natural fibers, the colloidal sulphides become highly resistantt to the dissolving action of and other attacks by the sea water. Typical of such organic fibers are the polymerized acrylonitrile or vinyl cyanide fibers. Ramie is a suitable example of natural fibers.

Such fibers, when left immersed in a fine colloidal suspension of, for instance, precipitated zinc sulphide, prepared by mixing dilute solutions of zinc chloride and sodium sulphide to a pH of approximately 6.0, will strongly adsorb a considerable percentage of the colloidal particles and hold them quite firmly. The treated fibers are white but will, when exposed to a flowing current of sea water, quite rapidly turn yellow, brown, and finally black, due to the precious and other metal ions adsorbed and collected from the sea water. These adsorbed ions may be stripped from the fibers by immersing the fibers in a warm dilute sodium cyanide solution with a small addition of hydrogen peroxide, or a dilute sodium hypochlorite solution with a small addition of hydrochloric acid.

After stripping of the adsorbed ions, the fibers may be washed and retreated with the zinc sulphide suspension for a further collecting operation.

Typical of other suitable precipitated sulphides which may be used in accordance with the invention are ferrous, cuprous, manganous, nickel, and lead sulphides. These will also adsorb and collect the more electronegative metal ions.

Certain gases which often are found normally and naturally dissolved in most sea water can have a deleterious effect on these collectors and collecting fibers. Such gases include dissolved oxygen, ozone, and carbon dioxide. If the relative concentrations of negative metal ions and deleterious gases in the sea water are such that the dissolved gases have an appreciable effect on the efficiency of the system, means may be provided for continuously prestripping such gases from the flowing sea water before it comes into contact with the collecting fiber structure. There are instances, however, where the sea water being processed is so enriched with the more electronegative metal ions and/or where the amount of dissolved gases is sufficiently low that the collecting fabric will collect the desired ions to near saturation without the necessity of removing the gases. These conditions may often exist when the collecting structure is located on the sea bottom in a relatively protected area, where there has been little mixing of the water and the bottom waters have been depleted of dissolved oxygen and other gases through biochemical action. If the bottom sediments have been disturbed by wave action, dredging, etc., the waters may be so highly enriched as to minimize the effect of the gases which may be present.

Light of certain wave lengths and intensity, and specifically strong sunlight, is considered to adversely affect the collecting ability of most of the sulphides utilized in the process of the invention. Accordingly, means are provided to exclude such light from the area of the collector.

Because of the relatively small amount of metal ions which are collected in one normal operation and also because of the difficulty of handling and treating unit masses of fibers, it is often desirable for the collector sensitizing operation, the sea water exposure, and the stripping of collected ions to be performed automatically and in continuous sequence. The process of the invention readily permits of a continuous procedure. However, in some instances, it may be desirable and practical to utilize a "batch" procedure, in which the sensitized fabric may be supplied in the form of an easily changeable cartridge or element. When saturated with adsorbed negative metal ions, the cartridge can be removed and replaced by a fresh cartridge. The removed fabric can then be stripped of its ion content and resensitized for subsequent further use.

The nature of the invention will be better understood by referring to the following description taken in conjunction with the accompanying drawings in which specific embodiments of the invention have been set forth for the purpose of illustration.

Brief description of the drawings

FIG. 1 is a diagrammatic representation of an apparatus for carrying out the process of the present invention on a continuous basis.

FIG. 2 is a horizontal section taken on line 2—2 of FIG. 1.

*Description of preferred embodiments*

Figure 3:
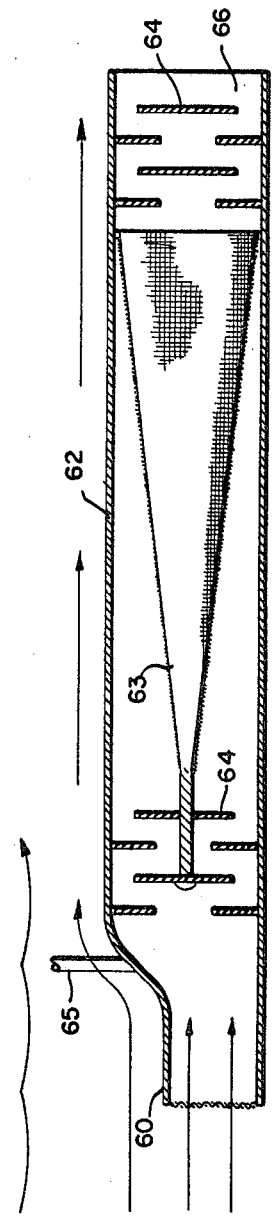
FIG. 3 and FIG. 4 is a diagrammatic representation of an apparatus for carrying out the process of the present invention on a batch basis.
Figure 4:
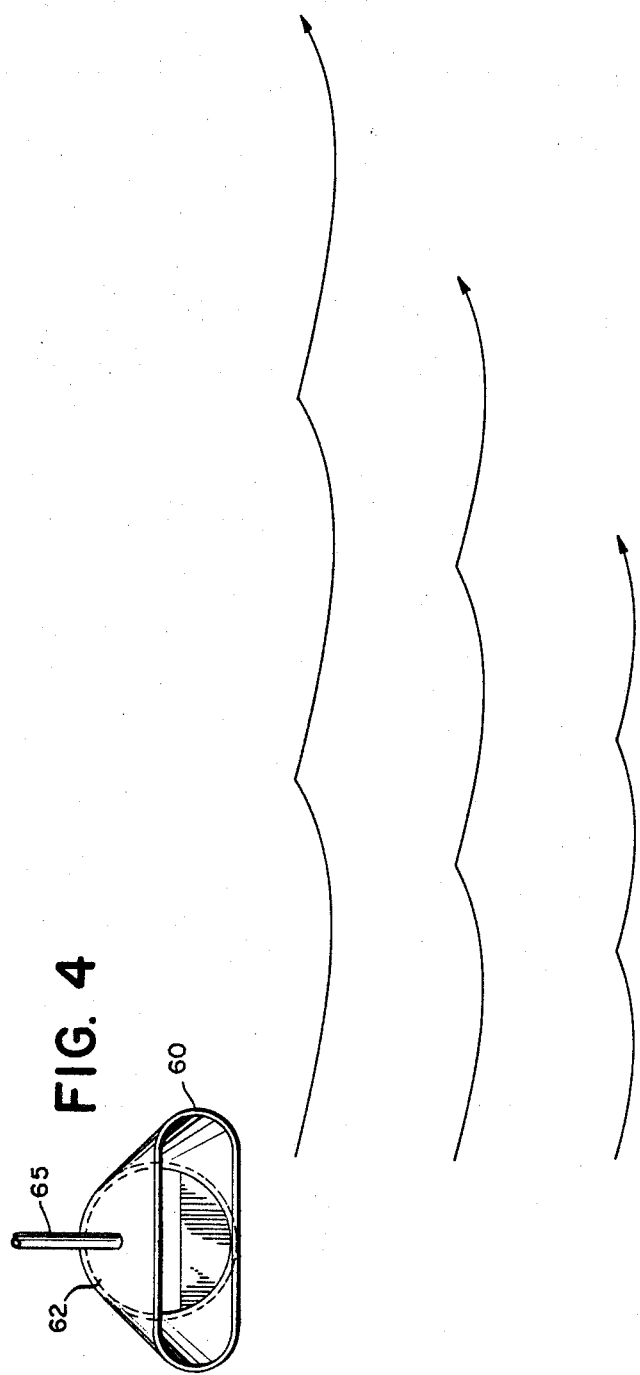

Referring now to FIG. 1 in detail, there is shown a continuous processing apparatus, a portion of which is immersed in sea water and a portion of which is contained above the water, as in a ship or barge. The apparatus is disposed in a flowing current (or, conceivably, it could be towed), and water enters through an inlet 10 and flows through a conical screen 11 having a coarse mesh to remove relatively large objects. The inlet 10 supplies the water to the lower part of an annular chamber 12 formed between the inner pipe 13 and an outer concentric pipe 14. The lower end of the chamber 12 is closed by an inclined bottom plate 15, and the chamber may be packed with a plurality of small plastic tubes or baffles 16 for the purpose of providing a large surface area over which the water flows as it rises. The tubes 16 may be formed of a suitable plastic material such as polyethylene or Teflon, or may be coated with a silicone varnish or wax. The surfaces should be of a material which is resistant to wetting with water. At the top of the chamber, which is well above the water surface, the outer shell or pipe 14 is closed by a bell 17 which may be connected by a pipe 18 to a suitable source of vacuum adapted to cause the water to rise in the annular chamber 12 and to remove the dissolved gases which are released by the passage of the water over the surface of the tubes 16 and by the reduced pressure in the bell 17. The suction in the chamber 12 may be effected by a suitable pump actuated by the energy of the flowing sea water current.

The dearated water then flows downwardly through a screen 19 adapted to minimize the retention of gas bubbles and through the central pipe 13 into a horizontal collecting zone or chamber 20 having riser pipes 21 and 22 disposed at its inlet and outlet ends respectively. The water duct in advance of the collecting chamber 20 may contain iron or steel turnings, to remove any residual dissolved oxygen in the water before the water passes through the collecting chamber.

In some instances, it has been found that prolonged contact of the water with the polyethylene plastic material serves to strip a large proportion of the oxygen from the water even under normal pressures. In such case, the oxygen accumulates as bubbles on the surface of the polyethylene from which it can be periodically removed. In this case, too, any residual oxygen can be removed by passing the water through a layer 57 of iron or steel turnings or iron sulphide particles or other material which is capable of reacting chemically with the oxygen. This layer may be held between screens 58 deposed in advance of the collecting chamber 20. The reducing materials may be replaced or removed when required.

If desired, hydrogen sulphide may be introduced into the water in advance of the collecting chamber for removing dissolved oxygen, as an alternative to or in addition to passing the water through the gas stripping stage. The hydrogen sulphide may be introduced, for example, through the nozzle 56 shown in FIG. 1.

A series of baffles 23 is disposed at the inlet end of the chamber 20 for distributing the water flow uniformly through the chamber, and a series of baffles 24 is disposed at the outlet end of the chamber 20 to provide a light shield to prevent light rays from entering the chamber. A belt 30, which may comprise a set of parallel yarns of acrylonitrile or Ramie, and which may be artificially bulked or crimped, is disposed to enter the chamber 20 through the riser 21 passing around a guide roll 31, thence axially of the chamber 20 around a second guide roll 32 and upwardly through the riser 22. This belt 30 may be in the form of a series of parallel yarns or may comprise loosely woven or knitted yarns of the same material, the weave in such case being sufficiently open to permit the ready flow of liquid therethrough. The belt 30 passes upwardly between squeeze rolls 33 and into a tank 34. The belt then travels around rolls 35, which are submerged in the tank 34, and passes between squeeze rolls 36 into a wash tank 37. Then the belt is directed around rolls 38 and through squeeze rolls 39 into a tank 40. In the tank 40 the belt 30 passes around rolls 41 and between squeeze rolls 42 and is guided into a second wash tank 43. The belt is passed around rolls 44, in the wash tank 43, and then through squeeze rolls 45 into a final tank 46. In this latter tank, the belt passes around rolls 47 and between squeeze rolls 49, thence downwardly, back into the riser 21, to complete a continuous circuit.

Selected ones of the beforementioned rolls may be suitably driven for advancing the belt at a predetermined slow rate through the chamber 20 and through the tanks 34, 37, 40, 43, and 45, in succession.

Advantageously, the tank 34 may contain a warm dilute solution of hydrochloric acid, at a pH of 0.5 to 1.5. While the belt 30 is passing through this tank, the residual zinc sulphide is dissolved and stripped from the yarn, along with some of the collected eletronegative metal ions.

The tank 40 contains a dilute cyanide solution in the proportion of, for example, 16 grams of sodium cyanide and 8 cc. of 30% hydrogen peroxide to 4000 cc. of water, or a hypochlorite solution in the proportion of, for example, 2 cc. of sodium hypochlorite bleaching solution to 5000 cc. of water brought to a pH of approximately 4.0 with hydrochloric acid. Most of the collected electronegative metal ions are stripped off the belt 30 by this solution. The solutions advantageously are warmed to approximately 150° F.

The final tank 46 contains a dilute suspension of colloidal precipitated sulphide of such electropositive metals as zinc or iron prepared, for example, by dissolving 80 grams of zinc chloride in 4000 cc. of water and 80 grams of sodium sulphide in the same amount of water and then mixing both to a pH of 6.0.

In operation, sea water is flowed into the inlet 10 of the apparatus, and sufficient suction is applied through suction line 18 to lift the water to the dome or bell 17 for deaerating the water prior to passage of the water through the collecting zone or chamber 20. As the water flows upwardly over the surfaces of the tubes 16 which are disposed in the annular chamber 12, the air bubbles are released and rise to the surface within the bell 17, from which they are removed. The deaerated water then flows downwardly through the center pipe 13 and into the collecting chamber 20. These bubbles tend to act as an "air lift" type pump to help the water to rise in the annular chamber.

In the continuous process illustrated in FIGS. 1 and 2, the belt 30 is "sensitized" with adsorbed electropositive metal sulphides as it passes through the final treating tank 46, and the sensitized belt then travels into the collecting chamber 20. As the deaerated water flows through the fiber mass of the belt 30 in the collecting chamber 20, the electronegative ions from the sea water are attracted to the electropositive metal sulphide ions and collect on the fibers of the belt. A baffle 59 in the chamber 20 may be used to direct the water to pass through the belt 30.

The belt, with the collected metal ions, is advanced at a predetermined slow rate and passed in succession through the treating tanks 34, 40 and 46 and the intermediate wash tanks 37 and 43. The processed water, from which the metal ions have been stripped, is discharged from the outlet end of the chamber 20 through the right baffle assembly 24.

As the belt passes through the first processing tank 34, the residual sulphides of the electropositive metal are stripped, along with some of the collected electronegative ions. Most of the remaining electronegative ions are stripped from the belt in the tank 40. In the tank 45, the colloidal particles of a precipitated electropositive metallic sulphide are adsorbed onto the surface of the fibers for resensitizing the belt.

The stripped electronegative ions collected in tanks 34 and 40 are converted to metals by any well-known chemical or metallurgical procedures.

It is believed that the operation is an ion exchange operation, the electronegative ions from the water being exchanged for the more electropositive metal ions on the belt. Thus, the belt 30 may be sensitized by colloidal zinc sulphide ions and passed through the collecting zone, from which light is excluded. In this case, the amount of ion exchange and the consequent deposition of the negative metal ions can be determined by the color change which is produced by the ion exchange reaction, and the belt may be advanced at a rate such that maximum deposition is obtained before the belt is fed to the stripping zone.

If desired, a propeller type pump 53, rotated and supported by a driving shaft 54 and followed by stationary angular guide vanes 55, may be installed at the outlet end of chamber 20 to assist in the flow of the sea water through the system. The propeller may be driven by a turbine wheel (not shown) actuated by the current of sea water.

Under certain conditions, to be described below, the gas stripping section of this apparatus can be eliminated. In that case, the sea water may be flowed directly from the inlet 10 and screen 11 into the collecting zone 20.

In the modified apparatus shown in FIG. 3, the collector body is provided with an inlet 60, through which the flowing sea water enters, after passing through a screen 61. The water then flows into a collecting zone or chamber 62. The inlet area 60 advantageously is enlarged, in its widthwise dimensions and is positioned near the base of the apparatus. The intended arrangement is such that the inlet will lie closely adjacent the surface of the sea bottom, when the unit as a whole is resting on the bottom.

A collecting element 63, advantageously an elongated conical element containing the treated fibers previously described, is located in the collecting chamber 62 and provides the adsorption medium by which the negative metal ions in the sea water are collected. The circular or base end of the conical element may be secured in the chamber "downstream" of the apex, as shown in FIG. 3.

Suitable baffles 64 are provided at the ends of the chamber 62, fore and aft of the collecting element, to screen out sunlight which could be detrimental to the ion exchange process. If the apparatus is located in water deep enough to naturally screen out sunlight, these baffles possibly could be eliminated.

After passing through the collecting element, the processed sea water leaves the apparatus through an outlet opening 66.

Advantageously, the inlet end of the FIG. 3 apparatus may be provided with a supply pipe 65, through which hydrogen sulphide and/or certain colloidal sulphides of the more electropositive metals may be trickled into the collecting zone while the FIG. 3 apparatus is in use. By this means, the FIG. 3 apparatus may be rendered more efficient and its period of effective collection may be extended.

The modified apparatus of FIG. 3 may be used when either the concentration of negative metal ions in the water is high enough to saturate the collecting element at an acceptable predetermined rate in the presence of dissolved gases, or the concentration of dissolved gases in the sea water is so low as not to unduly effect the adsorption of negative metal ions, or both. Both of these conditions may be found at times on selected areas of the sea bottom, in varying degrees, and both factors may combine to eliminate the necessity for gas stripping.

By way of example, the cooled concentrated saline effluent from plants converting sea water to fresh water by the distillation process is relatively free of gases. The stripping of dissolved gases from this water thus is not required, since the preceding distillation process has already substantially removed such gases. It is also to be noted that some ocean waters contain dissolved hydrogen sulphide or other sulphides. These dissolved hydrogen sulphide or other sulphides will react with dissolved oxygen to form water ($H_2O$) and precipitated colloidal sulphur. The dissolved oxygen is thus effectively deactivated and it has been found that such water can be run through the collecting process without the necessity for gas stripping.

In addition to the above, I have discovered that, under relatively calm conditions, the sun striking and warming the upper layers of sea water, in more or less protected areas, can so decrease the specific gravity of these upper layers that there is little or no mixing of the upper layers of water with the bottom layers. Because of biochemical actions of the organisms associated with bottom sediments of the sea, the quiescent bottom layers of such waters can become depleted of dissolved oxygen and other gases, and may actually build up a sulphide content. I have also discovered that many of these bottom sediments contain metal compounds which can be broken down and released by such biochemical action.

Accordingly, under advantageous circumstances and in the selected areas, the bottom layer of sea water, flowing slowly under conditions of relatively undisturbed, relatively laminar flow, preferably over a relatively smooth sediment surface, as under the influence of tides, will not only be significantly depleted of dissolved oxygen and gaseous content, but may also contain a relatively enriched content of collectible metal ions and/or colloids. Under the adavntageous conditions described, the relatively simplified type of collecting apparatus shown in FIG. 3 may be entirely suitable for making economical collections. This is particularly true if the collecting apparatus is rested directly on the sea bottom, in line with the flowing current and with the intake opening immediately adjacent the sea bottom, facing the direction of current flow. As previously mentioned, the intake opening advantageously is located near the base of the collecting unit, so as to receive the flow of the bottommost layers of water (e.g., the bottom 6 or 8 inches). These bottommost layers are most likely to be relatively freer of contained gases and relatively more enriched with metal values than water layers even a few inches higher. This is because the extreme bottom layers, forming a boundary layer between the moving tide currents and the nonmoving bottom surface, tend to be relatively less disturbed than other areas of slightly higher water layers, which gives rise to the conditions that result in gas depletion and metal value enrichment.

Where the collecting unit is laid on the sea bottom, only the natural current flows should be utilized in the processing, in order to maintain proper hydrostatic balance in the area of the unit and avoid drawing in undesired waters from higher layers.

Under some conditions, the collected metal content of a fully saturated collection element 63 of the FIG. 3 apparatus may be sufficiently high to economically justify periodic servicing of the units, to remove a saturated collecting element and replace it with a newly sensitized one. It should be understood, however, that the continuous recycling procedure described in connection with the apparatus of FIGS. 1 and 2 may be readily employed in conjunction with the apparatus of FIG. 3.

It should be understood that the specific forms of the invention herein described are intended to be illustrative only, as certain changes may be made therein without departing from the clear teachings of the disclosure. Accordingly, reference should be made to the following appended claims in determining the full scope of the invention.

I claim:

1. A method of recovering metals from sea water, which comprises:

(a) passing the water through a collecting zone in contact with a member having a large surface area, and carrying metal ions which are more positive than the ions of the metal to be collected under ion exchange conditions, whereby the more negative metal ions from the sea water are deposited on said member, and (b) stripping such deposited ions from said member.

2. The method set forth in claim 1, in which:
(a) the dissolved gases are removed from the water prior to passing the water through the collecting zone.

3. The method set forth in claim 1, wherein:
(a) after said stripping step, electropositive ions are deposited on said member, and
(b) said member is reused for collecting purposes in a recycling system.

4. The method set forth in claim 1, wherein:
(a) the sea water is caused to flow over a series of members having a large surface area and composed of a material which is not wetted by the sea water, while
(b) maintaining said water under a reduced pressure, whereby
(c) the dissolved gases are stripped from the water.

5. The method set forth in claim 1, in which:
(a) said collecting member carries electropositive ions of a metal sulphide.

6. The method set forth in claim 1, in which:
(a) said collecting member is sensitized in the presence of a colloidal sulphide of a metal which is more positive than the metals to be collected.

7. The method set forth in claim 1, in which:
(a) the deposited negative metal ions are stripped from said collecting member by contact with a dilute cyanide solution.

8. The method set forth in claim 1, in which:
(a) the deposited negative metal ions are stripped from said collecting member by contact with a dilute hypochloride solution.

9. The method set forth in claim 1, in which:
(a) the remaining metal sulphide is removed from said collecting metal ion by a dilute hydrochloric acid solution, and
(b) the deposited metal ions are stripped from the collecting metal ion by a solution containing a substance selected from the group which consists of a cyanide and hypochlorite.

10. The method set forth in claim 1, in which:
(a) said collecting metal ion carries a deposition of colloidal zinc sulphide, and
(b) means is provided to exclude light from the collecting zone.

11. A method of recovering metals from sea water, which comprises:
(a) passing a current of sea water through a collecting zone having a contacting surface carrying metal ions which are more positive than the ions of the metals to be collected,
(b) enabling said surface to collect the relatively negative metal ions from the sea water, and
(c) stripping said surface of deposited ions.

12. The method of claim 11, in which:
(a) the current of sea water is a natural current flowing under relatively undisturbed, relatively laminar flow conditions immediately adjacent and effectively in contact with the sea bottom sediments.

13. The method of claim 12, in which:
(a) said natural currents are selected from sea bottom areas in which there is a natural biochemical action, resulting in a removal of dissolved oxygen from the water and/or enrichment of the metal values available in the water.

References Cited
UNITED STATES PATENTS

| | | | |
|---|---|---|---|
| 2,653,089 | 9/1953 | Brooke | 75—108 |
| 2,726,141 | 12/1953 | Appell | 75—101 |
| 2,866,827 | 12/1958 | Jurgeleit et al. | 210—24 |
| 2,974,101 | 3/1961 | Richter | 210—24 |
| 3,062,379 | 11/1962 | Bryan | 210—24 |
| 3,094,437 | 6/1963 | Scheer | 75—0.5 |
| 3,317,312 | 5/1967 | Kraus et al. | 75—108 |

JOHN H. MACK, *Primary Examiner.*

A. C. PRESCOTT, *Assistant Examiner.*

U.S. Cl. X.R.

204—101; 75—108, 0.5; 210—24; 266—22; 299—5, 9